United States Patent [19]
Lewis

[11] Patent Number: 5,357,707
[45] Date of Patent: Oct. 25, 1994

[54] FLY FISHING LEADER CARRIER

[76] Inventor: Mark B. Lewis, 219 Dakota Ave., Fort Myers Beach, Fla. 33931

[21] Appl. No.: 161,809

[22] Filed: Dec. 6, 1993

[51] Int. Cl.⁵ .............................................. A01K 97/06
[52] U.S. Cl. ........................................ 43/57.2; 224/203
[58] Field of Search ................ 43/57.2, 57.1, 54.1; 224/103, 203, 163; D22/134

[56] References Cited

U.S. PATENT DOCUMENTS

| | | | |
|---|---|---|---|
| 197,935 | 12/1877 | Holt | 43/57.2 |
| 639,454 | 12/1899 | Smith | 43/57.2 |
| 1,478,497 | 12/1923 | Welch | 43/57.1 |
| 1,490,370 | 4/1924 | Figley | 43/57.2 |
| 1,543,120 | 6/1925 | Raber et al. | 43/57.1 |
| 2,041,231 | 5/1936 | Collins | 43/57.2 |
| 2,208,649 | 7/1940 | Strom | 43/57.2 |
| 2,760,296 | 8/1956 | Faul | 43/57.2 |
| 4,073,328 | 2/1978 | Franklin | 206/315.11 |
| 5,157,862 | 10/1992 | Companiony | 43/57.2 |

FOREIGN PATENT DOCUMENTS 1201430 12/1959 France ............................... 43/57.1

*Primary Examiner*—P. Austin Bradley
*Assistant Examiner*—Jeanne M. Elpel
*Attorney, Agent, or Firm*—Merrill N. Johnson

[57] ABSTRACT

A fly fishing leader carrier is designed to retreivably store a plurality of fishing leaders on the back of a fisherman. The fishing leader carrier includes an elongated rectangular fishing leader holder which has a number of stretchable elastic loops and an equal number of parallel slots designed to hold under tension an equal number of fishing leaders. The fishing leader carrier also includes an elongated strap whose opposite ends are attached to the opposite ends of the elongated fishing leader holder. The strap also includes a separable two-part buckle which enables the strap to be readily separated into two parts and then joined together.

2 Claims, 1 Drawing Sheet

U.S. Patent
Oct. 25, 1994
5,357,707
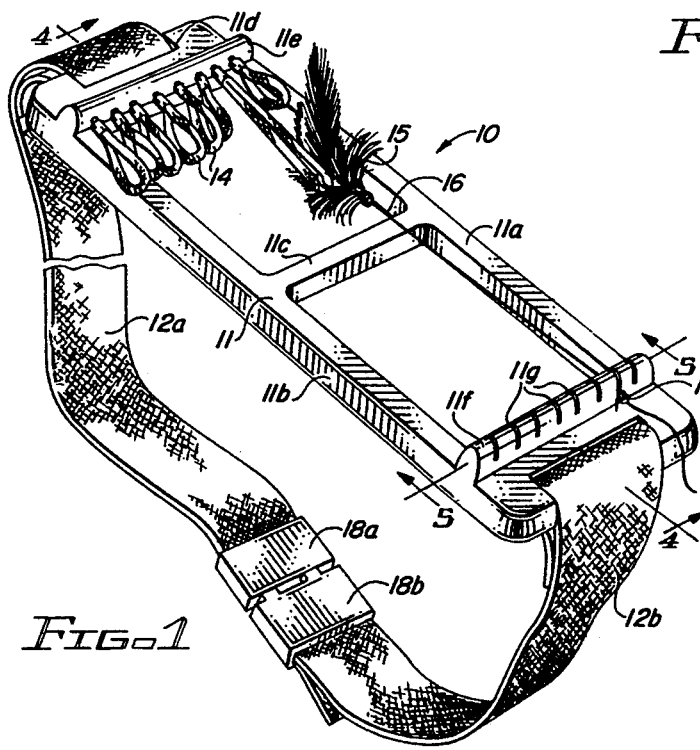
FIG-1
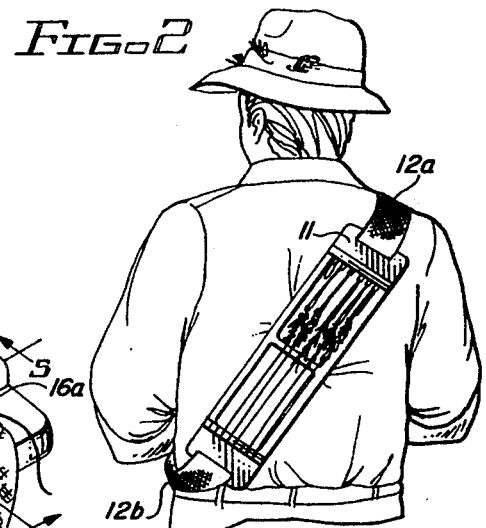
FIG-2
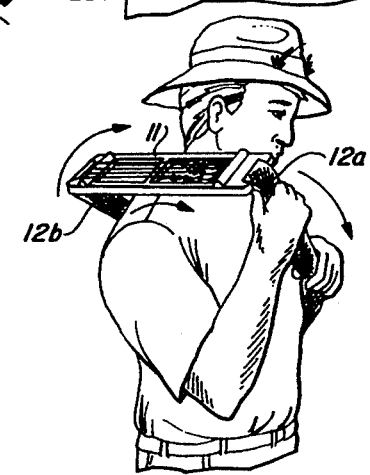
FIG-3
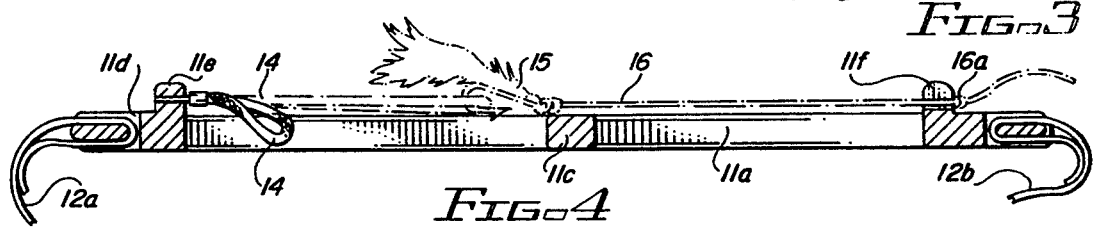
FIG-5
FIG-4
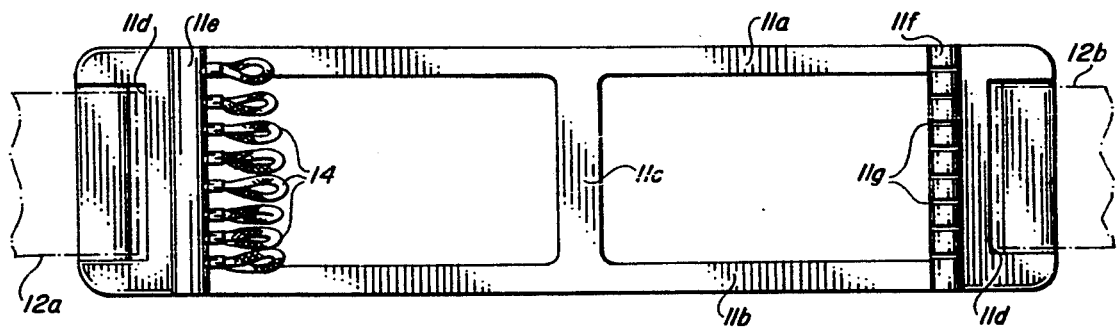
FIG-6

FLY FISHING LEADER CARRIER

My invention relates to a fly fishing leader carrier for providing the fly fisherman with an orderly and readily accessible selection of leadered flies or lures. When not in use in the hands of the fly fisherman, the selection of leadered flies or lures is stored out of the way on the back of the fisherman.

BACKGROUND OF THE INVENTION

Fly fishing leaders conventionally consist of a length of monofilament plastic line or plastic coated steel wire with a knot or swivel at one end and mounted on the opposite end an artifical fly or a fish lure containing one or more fish hooks. Fly fishermen must carry with them a selection of fly fishing leaders and to prevent the multiplicity of leaders from becoming a tangled mass of hooks, lures and wires, numerous fishing leader holders have been patented and sold. See, for example, Holt U.S. Pat. No. 197,935; Figley U.S. Pat. No. 1,490,370; Strom U.S. Pat. No. 2,208,649; and Companiony U.S. Pat. No. 5,157,862.

However, so far as I am aware no patented fishing leader holder or no fishing leader holder presently on the market provides an orderly and readily accessible selection of fishing leaders which when not needed in the hands of the fishman can be stored in a position from which it can be quickly recovered into the hands of the fisherman even when he is hip deep in the middle of a trout stream.

BRIEF DESCRIPTION OF THE INVENTION

I have invented, constructed and tested a fly fishing leader carrier which solves a problem experienced by fishermen wading in water or walking a shoreline while fishing. The problem is to have readily available an orderly selection of leadered flies or lures.

I solved the problem by designing an open faced rectangular leader holder which has near one end a series of spaced apart elastic loops and at its opposite end a series of spaced apart slots. Preferably the open faced leader holder is made of moisture resistant wood such as teak but it can be made of preferably light weight metal or dense high strength plastics such as nylon or styrene. The holder may be a solid rectangle but preferably is an open rectangular frame to reduce its weight.

The holder's elastic loops are preferably attached to the holder by hooks or swivels mounted on an elongated ridge near the end of the holder. The slots at the opposite end of the holder are cut parallel to the two longer edges of the holder in an elongated ridge near the opposite end of the holder.

The leaders are detachably stored on the holder by looping the fishhook of the fly or lure over one of the holder's elastic loops and then fitting the other end of the leader into one of the slots on the opposite end of the holder with the leader's knot or swivel on the side of the slot furthest from the elastic loop. Thereby the leader is held securely under the tension created between the leader's knot or swivel and the streched elastic loops. The number of leaders which can be stored on the holder depends on the number of elastic loops and slots appearing on the holder.

Identical slots are provided at the opposite ends of the leader holder to accomodate the opposite ends of a two-part carrying strap. The strap is permanently attached to the holder by looping each one of the two ends of the strap through one of the elongated slots in one end of the holder and stitching both looped ends into a closed loop. The opposite ends of both parts of the two-part strap contain mating halves of a buckle which locks when the two halves are pushed together and unlocks by depressing a button.

When the fishman has filled the leader holder with a desired selection of leadered flies or lures, he unbuckles the strap, slings the holder over his shoulder and then buckles the strap together and thereby storing the selection of leaders out of the fisherman's way against his back. Then when the fisherman desires to select a new fly or lure, he grasps the strap where it is resting on his shoulder and pulls the holder over his shoulder and into his hands to select a new leadered fly or lure.

BRIEF DESCRIPTION OF THE DRAWINGS

The appended sheet of drawings illustrates a preferred embodiment of my fly fishing carrier in which FIG. 1 is a perspective view of the preferred embodiment;

FIG. 2 is a perspective view of the carrier's fishing leader holder stored against the fisherman's back;

FIG. 3 is a perspective view showing the fisherman retreiving the leader holder;

FIG. 4 is a cross-sectional side view of the carrier's fly fishing leader holder taken along line 4—4 of FIG. 1

FIG. 5 is a cross-sectional view of the holder's slots taken along line 5—5 of FIG. 1; and FIG. 6 is a top plan view of the carrier's fly fishing leader holder.

DETAILED DESCRIPTION OF THE PREFERRED EMBODIMENT

FIG. 1 of the drawing illustrates a preferred form of my fly fishing carrier 10 which consists of a fishing leader holder 11 to which is affixed a two-part strap 12a and 12b.

Leader holder 11 is preferably made of teak in the form of a hollow rectangle and includes elongated side bars 11a and 11b, cross bar 11c, and an elongated slot 11d adjacent each end of the holder. In order to store leadered flies and lures, holder 11 includes two elongated ridges 11e and 11f which project upwardly near the opposite ends of the holder.

Ridge 11e, as best shown in FIG. 1 supports a series of spaced apart elastic loops 14. Ridge 11f, as best shown in FIGS. 1 and 4, contains a series of slots 11g spaced apart similar to the spacing between adjacent elastic loops 14. To store a leadered fly 15 or lure on the holder, first loop the fly's fishhook around one of the elastic loops 14 and then grasping the other end of leader 16, pull the leader away from the elastic loops and toward the slotted ridge 11f, and then with tension on the line, slip leader 16 into the slot 11g directly opposite the elastic loop onto which the leader's fishhook is located whereby knot 16a keeps the leader under tension and securely stores the leadered fly or lure onto the holder.

Strap halves 12a and 12b are permanently secured to the opposite ends of holder 11 by threading each end of the two strap halves through one of the elongated slots 11d of the holder to form a loop and then sewing the end of the strap to itself. The free ends of each strap half is provided with one half of a buckle 18. Buckle halves 18a and 18b are designed to lock together when pushed together and by means of a button which, when pushed, unlocks and uncouples buckle 18.

when the holder is filled with a selection of leadered flys and/or lures, the fisherman uncouples buckle 18 and grasping strap half 12a, throws the holder over his shoulder so the holder is resting on his back as shown in FIG. 2. The fisherman then pushes buckle halves 18a and 18b together to secure the leader-filled holder 11 against the fisherman's back.

Then when the fisherman desires to select a new fly or lure, as shown in FIG. 3 he grasps that portion of strap 12a resting on his shoulder and pulls the strap down. This motion brings the holder up, over the fisherman's shoulder and into his hands.

While I have illustrated and described a preferred embodiment of my fly fishing leader carrier, changes and modifications will be apparent to those skilled in the art. No limitation should be implied by the foregoing description since the scope of my invention is limited only by the appended claims.

I claim:

1. A fishing leader carrier designed to retrievably store a selection of spaced apart fishing leaders on the back of a fisherman comprising
   an open faced rigid elongated rectangular fishing leader holder,
   said rigid fishing leader holder including means for removably storing under tension a selection of spaced apart fishing leaders, and
   an elongated flexible strap having one end attached to one end of the elongated fishing leader holder and its other end attached to the opposite end of the fishing leader holder,
   said strap being of sufficient length to fit over one shoulder of the fisherman and to position the fishing leader holder flat against the back of the fisherman,
   said strap including a separable two-part buckle to enable the elongated strap to be readily separated into two parts while the fishing leader holder is positioned against the fisherman's back and then the two parts of the strap are joined together.

2. A fishing leader carrier designed to retrievably store a selection of spaced apart fishing leaders on the back of a fisherman comprising,
   an open faced elongated rectangular fishing leader holder,
   said holder's means for removably storing under tension the fishing leaders includes a plurality of spaced apart elastic loops attached to an elongated ridge near one end of the holder and a series of spaced apart parallel slots in an elongated ridge near the opposite end of the holder, and
   an elongated flexible strap having one end attached to one end of the elongated fishing leader holder and the other end attached to the opposite end of the fishing leader holder,
   said strap including a separable two-part buckle to enable the strap to be readily separated into two parts and then joined together.

* * * * *